United States Patent
Sato et al.

(10) Patent No.: US 6,541,186 B2
(45) Date of Patent: *Apr. 1, 2003

(54) METHOD OF MANUFACTURING AN OPTICAL DISK HAVING AREAS OF DIFFERENT RECORDING DENSITIES OR FUNCTIONS

(75) Inventors: Nobuyuki Sato, Hamamatsu (JP); Katsuichi Osakabe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 2 days.

This patent is subject to a terminal disclaimer.

(21) Appl. No.: 09/930,585

(22) Filed: Aug. 15, 2001

(65) Prior Publication Data

US 2002/0006104 A1 Jan. 17, 2002

Related U.S. Application Data (62) Division of application No. 09/198,958, filed on Nov. 24, 1998, now Pat. No. 6,310,854.

(30) Foreign Application Priority Data

Dec. 8, 1997 (JP) .............................................. 9-336972
Nov. 28, 1997 (JP) .............................................. 9-329095

(51) Int. Cl.[7] ................................................ G11B 7/24
(52) U.S. Cl. .................. 430/321; 430/270.15; 430/945; 428/64.8; 428/64.4; 369/275.2; 369/275.3
(58) Field of Search ........................... 430/270.13, 321, 430/945, 270.15; 428/64.8, 64.4; 369/275.2, 275.3

(56) References Cited

U.S. PATENT DOCUMENTS

| | | | | |
|---|---|---|---|---|
| 4,972,402 A | * | 11/1990 | Muira et al. .............. | 369/275.1 |
| 5,110,707 A | * | 5/1992 | Fujita et al. ................. | 430/945 |
| 5,138,598 A | | 8/1992 | Sako et al. ................... | 369/47 |
| 5,241,531 A | | 8/1993 | Ohno et al. ............... | 369/275.2 |
| 5,425,008 A | * | 6/1995 | Ohta et al. ................ | 369/275.2 |
| 5,684,785 A | * | 11/1997 | Itami et al. .............. | 369/275.2 |
| 5,732,088 A | | 3/1998 | Sako .......................... | 714/701 |
| 5,757,752 A | | 5/1998 | Sako .......................... | 369/59 |
| 5,812,519 A | | 9/1998 | Kawamura et al. ...... | 369/257.3 |
| 5,953,309 A | | 9/1999 | Yoshimoto et al. ...... | 369/275.3 |
| 6,031,808 A | * | 2/2000 | Ueno ....................... | 369/275.3 |
| 6,038,208 A | | 3/2000 | Shikunami et al. ...... | 369/275.3 |
| 6,049,521 A | * | 4/2000 | Aratani .................... | 369/275.1 |
| 6,078,559 A | | 6/2000 | Takemura et al. ....... | 369/275.3 |
| 6,310,854 B1 | * | 10/2001 | Sato et al. ............... | 369/275.2 |

FOREIGN PATENT DOCUMENTS

JP          6176367         6/1994

* cited by examiner

*Primary Examiner*—Martin Angebranndt
(74) *Attorney, Agent, or Firm*—Pillsbury Winthrop LLP (57) ABSTRACT

An optical disk includes a standard area of a standard recording density provided on an inner peripheral sided and a high density area of a higher recording density provided on an outer peripheral side. In each of the standard area and the high density area, a program area is provided so that an independent program can be recorded in each program area. In one aspect of the invention, an optical disk includes, from the inner preriphery to the outer periphery of the disk, a ROM area for read-only purpsoe, a RAM area in which information can be rewritten and a WO area in which information can be written only once.

8 Claims, 12 Drawing Sheets

METHOD OF MANUFACTURING AN OPTICAL DISK HAVING AREAS OF DIFFERENT RECORDING DENSITIES OR FUNCTIONS

This is a divisional of U.S. patent application Ser. No. 09/198,958, filed Nov. 24, 1998, now U.S. Pat. No. 6,310,854.

BACKGROUND OF THE INVENTION

This invention relates to optical disks such, for example, as a CD, a CD-ROM, a CD-R, a CD-RW, a CD-I, a MD and a DVD and, more particularly, to optical disks having two areas of different recording densities. This invention relates also to optical disks having areas of different functions and to a method of manufacturing such optical disks and also to a method of recording information on such optical disks.

Optical disks such as a CD, a CD-ROM and a CD-R having a standard recording density have a track pitch of 1.6 $\mu$m and a linear velocity of 1.2 m/s to 1.4 m/s. With the recent tendency to using a laser beam spot of a smaller diameter, optical disks having a higher recording density have been developed. For example, a DVD-ROM has a track pitch of 0.74 $\mu$m and linear velocity of 3.94 m/s and has a recording capacity which is seven times as large as a CD.

In case a large amount of data such as a moving picture data is to be recorded in coping with the tendency to increasing the recording capacity of an optical disk, an optical disk having a high recording density may be used.

An optical disk drive device which can cope with media having a high recording density can drive also an optical disk having a lower recording density whereas an optical disk drive device which can reproduce only a CD having a standard recording density cannot drive an optical disk having a high recording density. For this reason, when an optical disk having a high recording density is used, conventional CD drive devices cannot reproduce such optical disk so that drive devices which can reproduce it are limited.

It is, therefore, a first object of the present invention to provide an optical disk which has a much larger recording capacity than a conventional optical disk of a standard recording density and yet is applicable also to a drive device which can reproduce only the conventional optical disk of the standard recording density.

Known also in the art of optical disks is one having areas of different functions. For example, Japanese Patent Application Laid-open 9-7223 discloses an optical disk having a ROM area used for read-only purpose and a RAM area which can be rewritten. This optical disk has advantages of both a read-only disk and a rewritable disk in that a large amount of copies can be produced from a software by using the ROM area while data can be written in the RAM area.

In this type of optical disk, information recorded in the ROM area cannot be erroneously overwritten but information recorded in the RAM area can be erroneously overwritten. In a floppy disk, overwriting can be inhibited but this can be made only for the entire disk and not for only a part of data which is important.

It is, therefore, a second object of the invention to provide an optical disk in which a recording mode can be selected depending upon the degree of importance of information.

It is a third object of the invention to provide a method for recording information on this optical disk.

It is a fourth object of the invention to provide a method for manufacturing this optical disk.

SUMMARY OF THE INVENTION

For achieving the first object of the invention, there is provided an optical disk comprising a first area of a standard recording density formed on an inner peripheral side of the optical disk, a second area of a higher recording density than the first area formed on an outer peripheral side of the optical disk, and a program recording area provided in each of the first and second areas, said program recording area being capable of recording a program independently of each other program recording area.

According to the invention, by using a different mode of recording for each of the first and second areas such as recording a standard program in the first area and a higher degree of program in the second area, a substantial degree of program can be reproduced with a conventional standard optical disk drive so that the optical disk according to the invention can provide interchangeability between the conventional optical disk drive and an optical disk drive exclusively used for an optical disk of a high recording density. Moreover, by providing a high recording density area in the outer peripheral side of the optical disk, the recording capacity can be increased substantially as compared with the conventional CD and the data transfer rate can also be increased.

Either or both of the first and second areas may be constructed as a read-only area. Likewise, either or both of the first and second areas may be constructed as an area which is capable of both writing and reading.

In one aspect of the invention, depth from a surface on which laser beam is irradiated to a recording surface of the second area is smaller than depth from the surface on which laser beam is irradiated to a recording surface of the first area. By this arrangement, a layer of a high refractive index may be made thinner in the high recording density area than in the standard recording density area and, accordingly, the amount of deviation of a beam spot caused by deflection or inclination of an optical disk can be reduced.

In another aspect of the invention, a border area between the first area and the second area is formed as a mirror area where all laser beam is reflected. By this arrangement, the largest level of reflected beam can be obtained in this mirror area and, accordingly, this area can be distinguished from the other areas by a simple signal processing. This arrangement is particularly effective in the high speed search operation.

In another aspect of the invention, a border area between the first area and the second area is an area where recording density changes gradually from the standard recording density to the higher recording density. By this arrangement, a tracking control can be made by gradually changing a servo parameter from the first area to the second area.

In another aspect of the invention, the first and second areas have a lead-in area, a program area and a lead-out area and TOC information of the program area of each area is recorded in the lead-in area of each area. By this arrangement, each area can be controlled independently and a drive device which can reproduce only an optical disk of the standard recording density can be accessed as if the optical disk was one having the first area only.

In still another aspect of the invention, the first area has a lead-in area and a program area and the second area has a program area and a lead-out area, TOC information of the program area of the first and second areas being recorded in the lead-in area of the first area. By this arrangement, TOC information of all areas can be obtained by accessing the first lead-in area only so that initial time of the drive device can be saved.

For achieving the second object of the invention, there is provided an optical disk comprising a rewritable area (hereinafter refereed to as "RAM area" in which recorded information can be rewritten and a write once area (hereinafter referred to as "WO area" in which information can be recorded only once.

The optical disk may further comprise a read-only area (hereinafter refereed to as "ROM area") capable of only reading recorded information.

According to this aspect of the invention, processing, addition and renewal of data can be made in the RAM area and important information for which processing has been completed and no more change needs to be made can be recorded in the WO area. Therefore, overwrite inhibit can be applied only to important data while freedom of rewriting is retained, so that the scope of information recording operation can be significantly broadened.

By further providing the ROM area, a further broadened scope of use can be ensured such that a predetermined program may be recorded in the ROM area and data input in accordance with this program may be processed in the RAM area and result of the processing may be recorded in the WO area.

For achieving the third object of the invention, there is provided a method for recording information in the optical disk as described above comprising a step of recording information which has been rewritten in the rewritable area in the write once area as overwrite inhibit information in accordance with a predetermined command.

For achieving the fourth object of the invention, there is provided a method for manufacturing the optical disk as described above comprising steps of a first masking step of covering a portion of an optical disk substrate other than a firs t area with a masking material, a step of forming an alloy layer consisting of an optomagnetic material or a phase changing material on the substrate masked by the first masking step, a first masking removing step of removing the masking material from the substrate formed with the alloy layer, a second masking step of covering a portion of the substrate other than a second area which is different from the first area with a masking material, a step of forming a dyestuff layer which changes with heat on the substrate masked by the second masking step, a second masking removing step of removing the masking material from the substrate formed with the dyestuff layer, and a step of forming a reflecting layer on the substrate formed with the alloy layer in the first area and the dyestuff layer in the second area.

According to this aspect of the invention, the RAM area can be formed by providing an alloy layer consisting of an optomagnetic material or a phase changing material and the WO area can be formed by providing a dyestuff layer which changes with heat. Accordingly, by performing masking in accordance with these areas to selectively form the alloy layer and the dyestuff layer, the optical disk of this aspect of the invention can be produced.

These and other objects and features of the invention will become apparent from the description made below with reference to the accompanying drawings.

BRIEF DESCRIPTION OF THE INVENTION

In the accompanying drawings.

DESCRIPTION OF THE PREFERRED EMBODIMENTS

Figure 1:
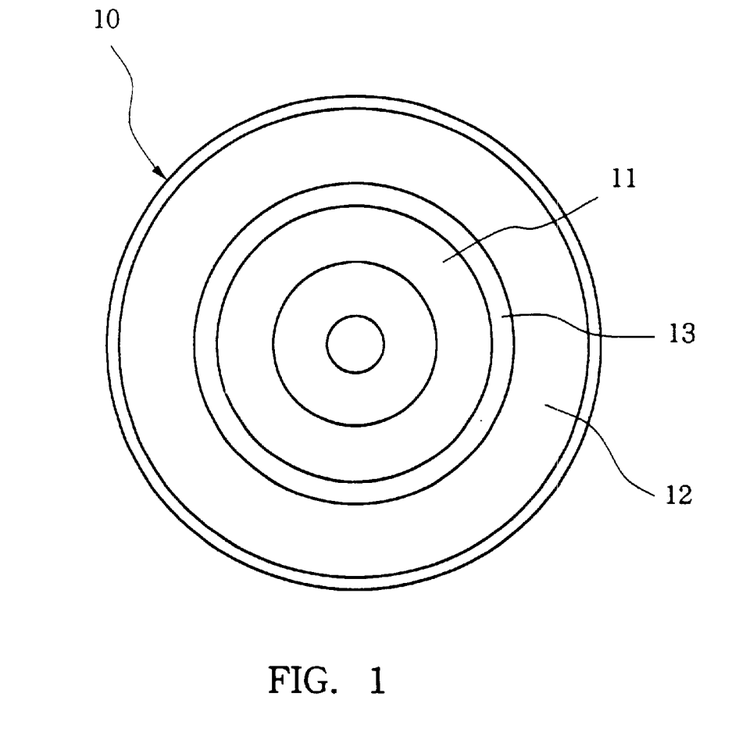
FIG. 1 is a plan view showing recording areas of an embodiment of the optical disk made according to the invention.

FIG. 1 shows an embodiment of the optical disk made according to the invention.

An optical disk 1 has a standard area 11 which constitutes the first area formed on the inner peripheral side of the disk, a high density area 12 which constitutes the second area formed on the outer peripheral side of the disk and a border area 13 formed between the two areas 11 and 12. The standard area 11 is an area in which, as in a standard CD or CD-ROM, a track is formed with track pitch of 1.6 $\mu$m and linear velocity of 1.2 m/s to 1.4 m/s. The high density area 12 is an area in which a track is formed with track pitch of, e.g., 1.15 $\mu$m and linear velocity of 0.96 m/s.

Figure 2:
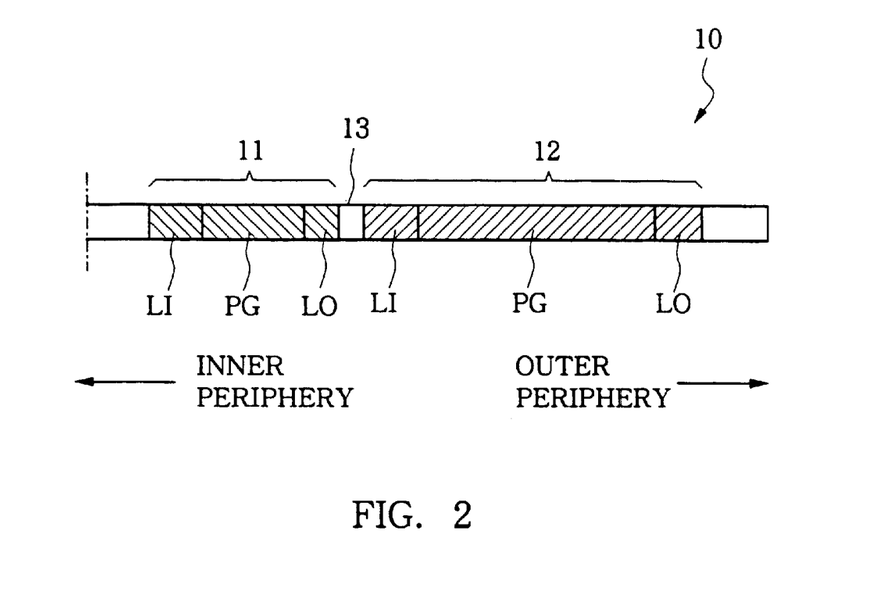
FIG. 2 is a partial sectional view of the optical disk.

Referring to FIG. 2 which is a partial sectional view of the optical disk 10, the standard area 11 provided on the inner peripheral side of the optical disk 10 and the high density area 12 provided on the outer peripheral side of the optical disk 10 respectively have a lead-in area LI, a program area PG and a lead-out area LO. More specifically, the lead-in area LI of the standard area 11 starts at the radius of, e.g., 23 mm and the program area PG of the standard area 11 starts at the radius of, e.g., 25 mm. At least 6 seconds are secured for the program area PG and at least 90 seconds are secured for the succeeding lead-out area LO. Since a pregap of 2 seconds or over is provided at the start point of the program area PG, at least 4 seconds must be secured as the net program area. This length corresponds to the rated minimum program time.

FIGS. 3A to 3D show forms of track which the standard area 11 and the high density area 12 can take.

Figure 3A:
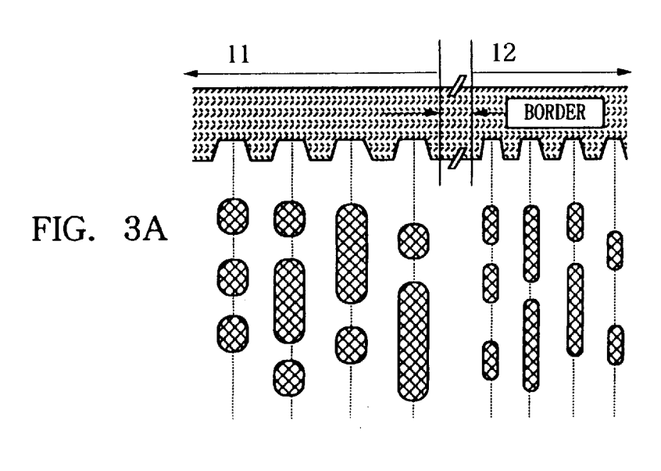
FIGS. 3A to 3D are enlarged views of the respective recording areas of the optical disk.
Figure 3B:
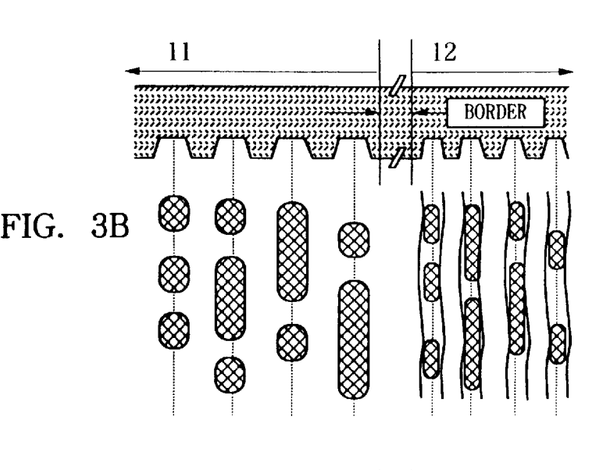

FIG. 3A shows an example of a track formed in case both the standard area 11 and the high density area 12 are read-only areas. FIG. 3B shows an example of a track formed in case the standard area is a read-only area and the high density area 12 is capable of both writing and reading.

Figure 3C:
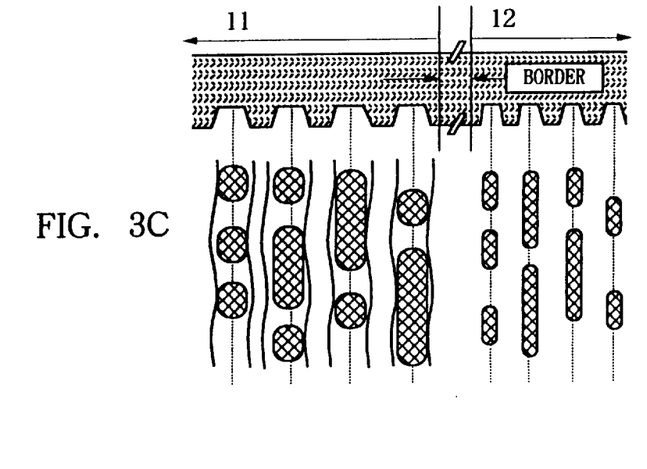
Figure 3D:
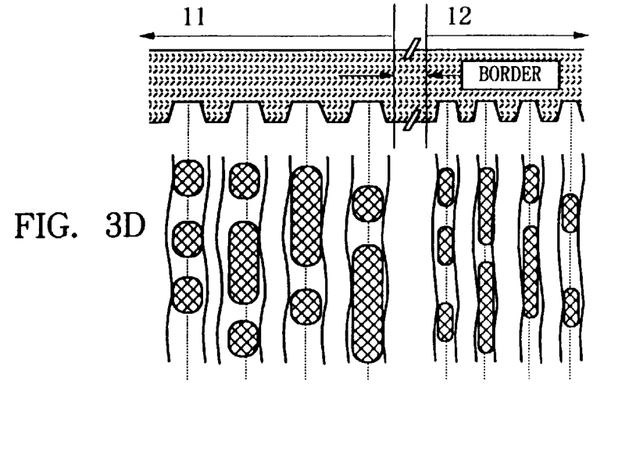

FIG. 3C is an example of a track formed in case the standard area 11 is capable of writing and reading and the high density area 12 is a read-only area. FIG. 3D is an example of a track formed in case both the standard area 11 and the high density area 12 are capable of writing and reading. In the areas which are capable of writing and reading, wobble is formed for detecting a record address.

Figure 4:
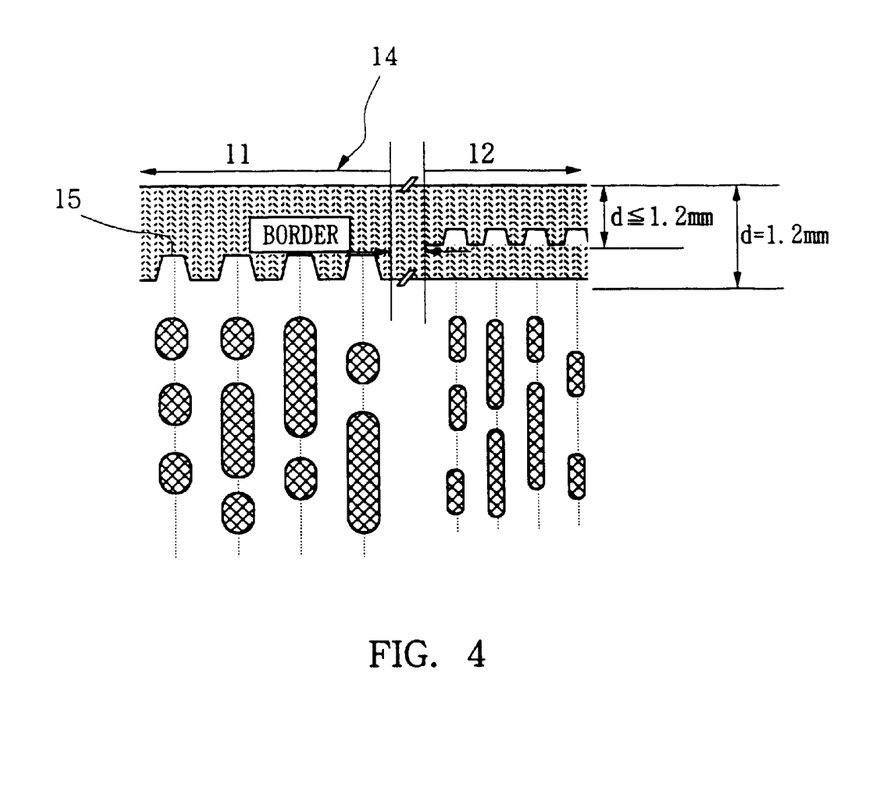
FIG. 4 is a view showing an example of the optical disk in which depth of recording differs in each area.

Referring to FIG. 4, depth d from a surface 14 on which laser beam is irradiated to recording surfaces of the respective areas may be set to 1.2 mm in the standard area and to a value below 1.2 mm, e.g., 0.8 mm, in the high density area. Since the portion of the optical disk between the surface 14 on which laser beam is irradiated to the recording surfaces 15 is filled with polycarbonate, the amount of deviation of a beam spot from its desired position increases with depth d because of deflection or inclination of the optical disk 10. The higher the recording density, the more remarkable is the adverse effect of such deviation of the beam spot. Accordingly, by making the depth d smaller in the high density area 12 than in the standard area 11, this adverse effect can be mitigated.

Figure 5A:
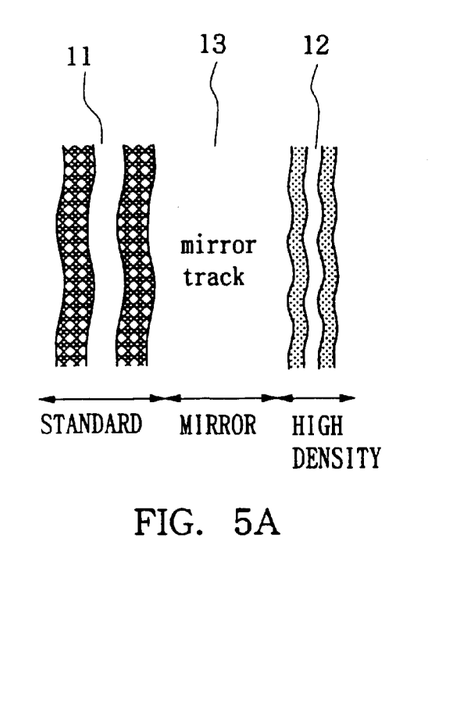
FIGS. 5A and 5B are enlarged views showing the border areas of the optical disk.
Figure 5B:
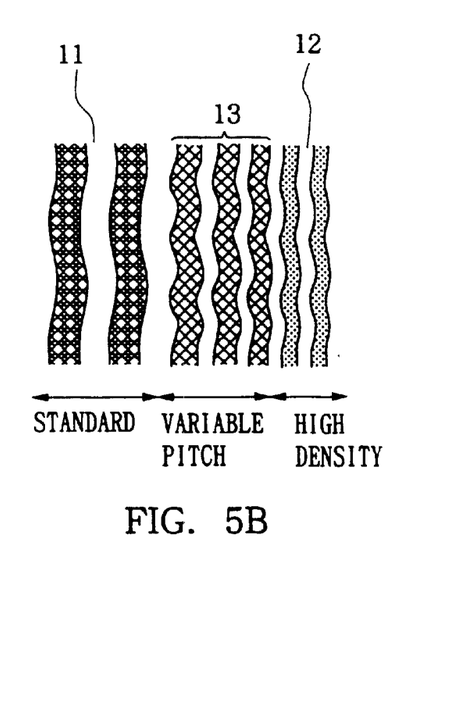

The border area 13 between the standard area 11 and the high density area 12 may be formed as a mirror area as shown in FIG. 5A in which all laser beam is reflected. Alternatively, the border area 13 may be formed as a variable pitch area as shown in FIG. 5B in which recording density changes gradually from a standard recording density to a higher recording density. It is also conceivable to connect a track of a standard pitch directly with a track of a higher density pitch but this form of tracks is hard to manufacture. In case the mirror area is used, detection of the border area 13 is easy as will be described later. In case the variable pitch 13 is used, there is the advantage that a continuous tracking becomes possible by gradually changing the servo parameter from the standard area 11 to the high density area 12.

Figure 6:
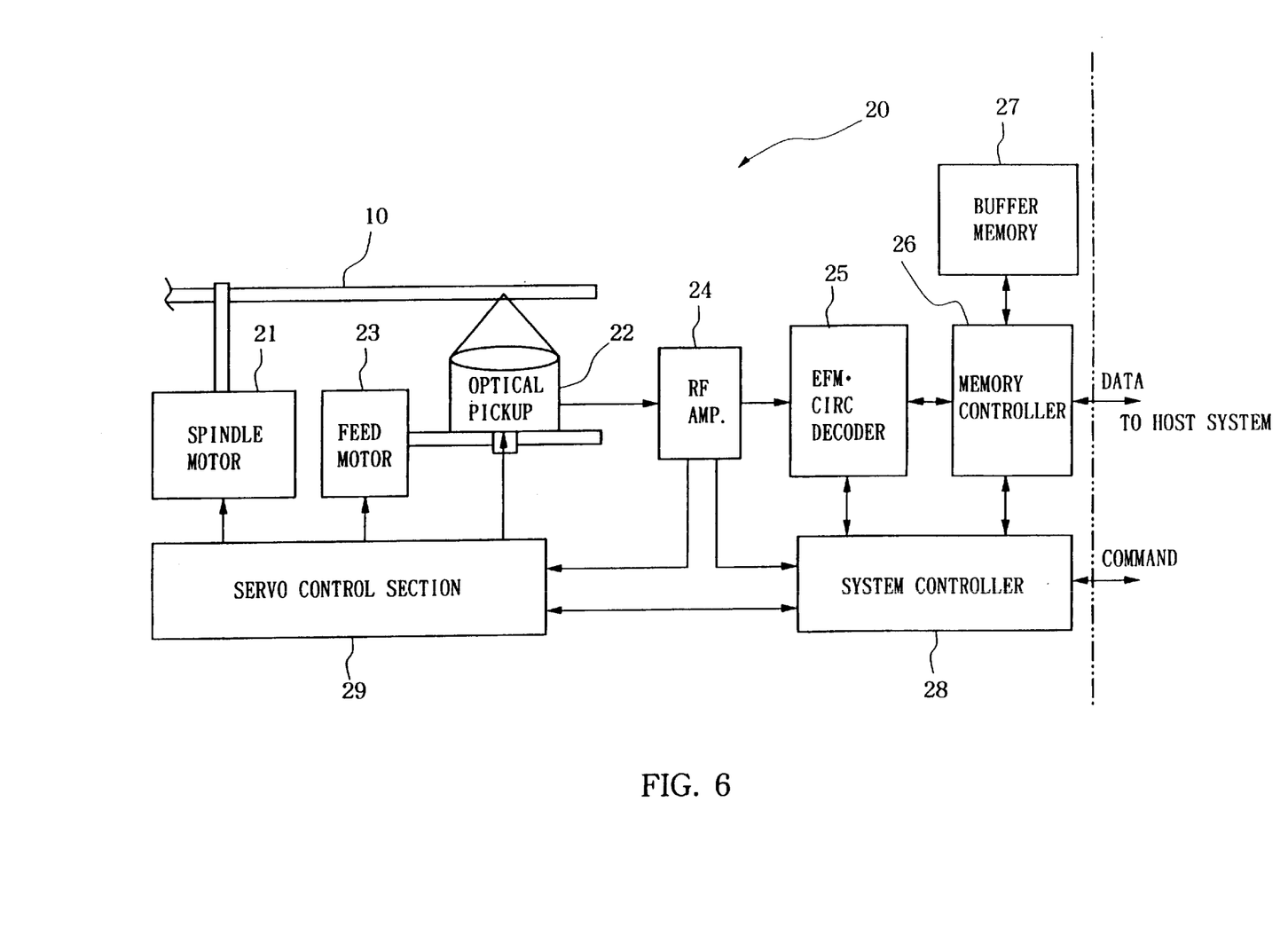
FIG. 6 is a block diagram showing an example of drive device for driving the optical disk.

FIG. 6 schematically illustrates an optical disk drive device 20 for driving the above described optical disk. This example is a read-only drive device.

An optical disk 10 is driven and rotated by a spindle motor 21 at a constant linear velocity. An optical pickup 22 is provided as reading means at a position opposite to the recording surface of the optical disk 10. The optical pickup 22 is driven by a feed motor 23 in the radial direction of the optical disk 10. A read out signal from the optical disk 10 is amplified by an RF (high-frequency) amplifier 24 and is supplied to an EFM-CIRC (cross interleaved Read-Solomon code) decoder 25. The decoder 25 subjects the amplified signal to EFM demodulation and CIRC decoding and supplies its output data to a buffer memory 27 to be once stored therein under the control of a memory controller 26 and supplies control information to a system controller 28. Data which is once stored in the buffer memory 27 is sequentially read out under the control of the memory controller 26 and supplied to an unillustrated host system. A servo control section 29 performs focusing and tracking controls of the optical pickup 22 in response to the output of the RF amplifier 24 and also controls the spindle motor 21 and the feed motor 23 in accordance with a command from the system controller 28.

Figure 7:
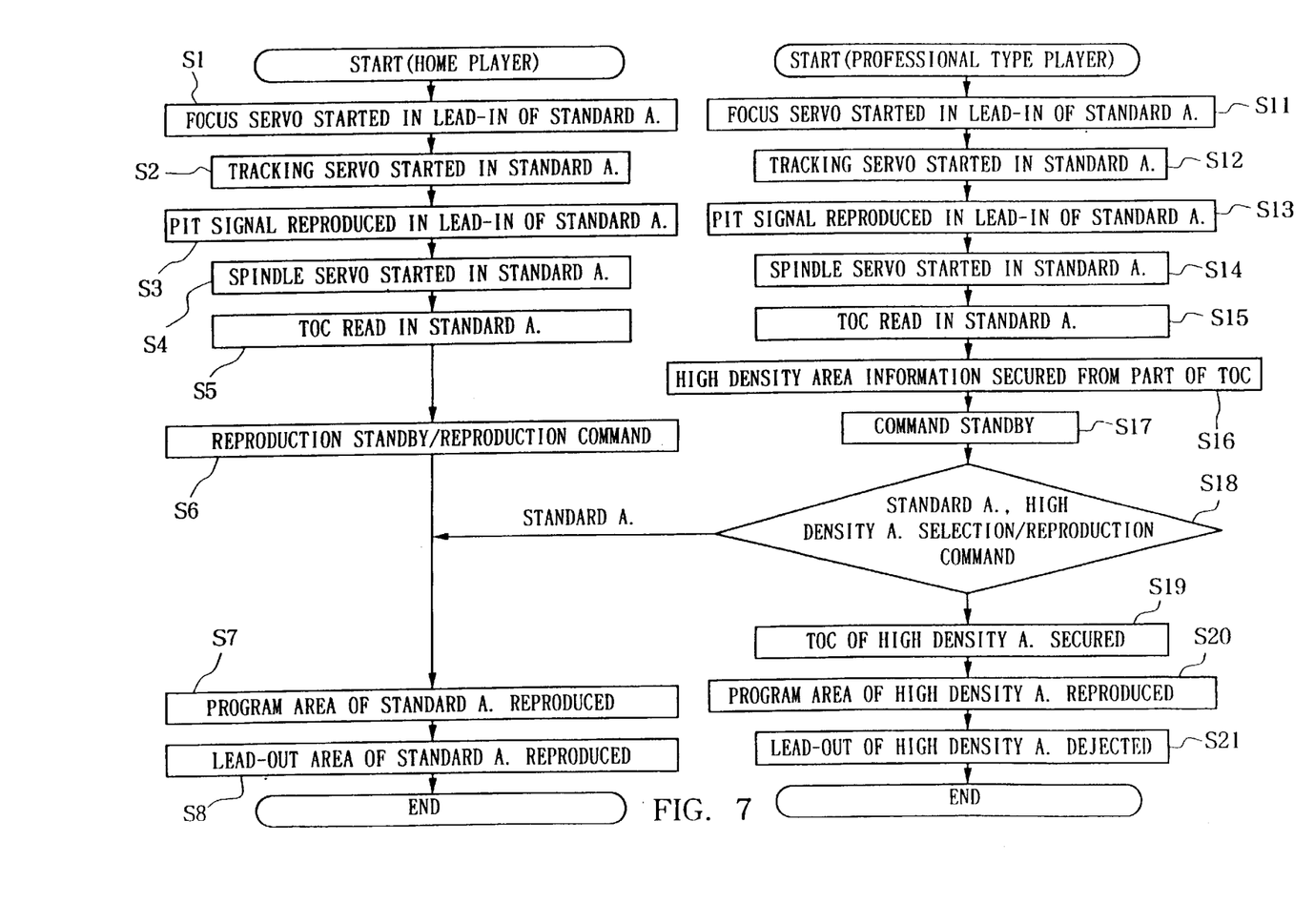
FIG. 7 is a flow chart illustrating the operation of the drive device.

FIG. 7 shows a routine of reproduction of an optical disk in the above described optical disk drive device 20 with respect to a case where the drive device 20 is a home player which can reproduce only an optical disk of a standard recording density and also with respect to a case where the drive device 20 is a high-class professioanl type player which can reproduce also an optical disk of a high recording density.

In a case where the drive device 20 is an ordinary home player, the focus servo is started in the lead-in area LI of the standard area 11 (S1) and, after starting of tracking servo (S2), reproduction of a pit signal (S3) and starting of spindle servo (S4), TOC information is read from a subcode frame of Q channel in the lead-in area LI of the standard area 11 (S5). The routine enters a reproduction command standby state (S6) and, upon inputting of a reproduction command, the program area PG in the standard area 11 is reproduced (S7). Upon detection of the lead-out area LO of the standard area 11, the reproduction operation is finished (S7). In this case, an arrangement is made so that reproduction is made only in the standard area 11 and the high density area 12 is hidden from the TOC information.

In a case where the drive device 20 is a high class professional type player which can reproduce also the high density area 12, focus servo is started in the lead-in area LI of the standard area 11 (S11) and, after starting of tracking servo (S12), reproduction of a pit signal (S13) and starting of spindle servo (S14), TOC information is read from the subcode frame of Q channel in the lead-in area LI of the standard area 11 (S15). At this time, the player secures information indicating existence of the high density area 12 from a part of the TOC information (S16). In this case, an arrangement is made so that information including record position of TOC information of the high density area 12 can be provided. The routine enters a reproduction command standby mode (S17). Upon inputting of a command for reproduction of the standard area 11, an operation which is the same as the above described reproduction of the standard area 11 is performed (S7, S8) whereas upon inputting of a command for reproduction of the high density area 12, TOC information is secured from the lead-in area LI of the high density area 12 (S19) and the program area PG of the high density area 12 is reproduced (S20). Upon detection of the lead-out area LO of the high density area 12, the reproduction operation is finished (S21).

Figure 8A:
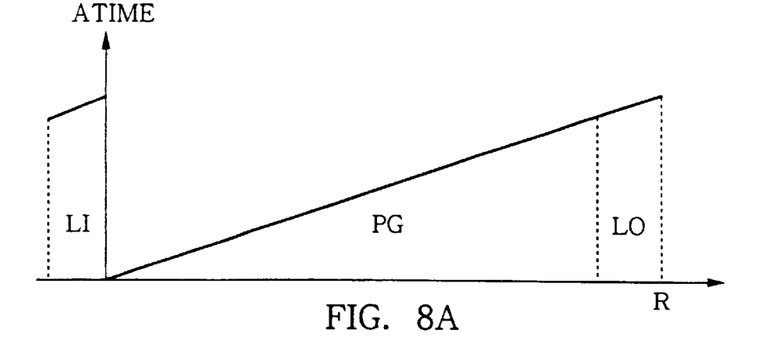
FIGS. 8A to 8C are diagrams showing relation between radius of recording and absolute time in comparison with a conventional optical disk.
Figure 8B:
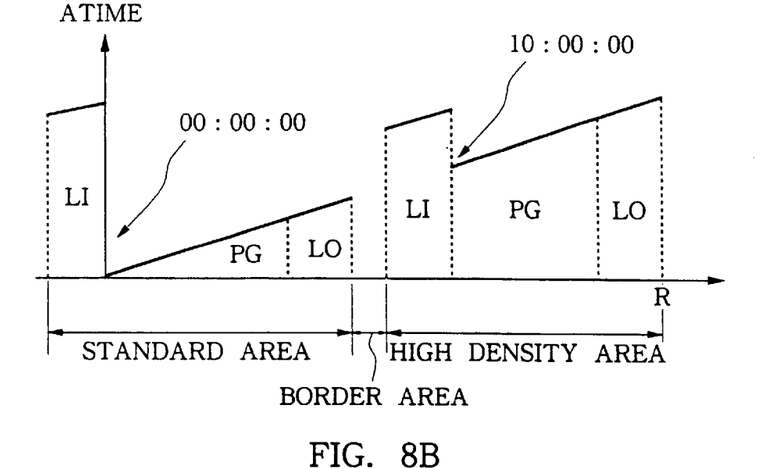
Figure 8C:
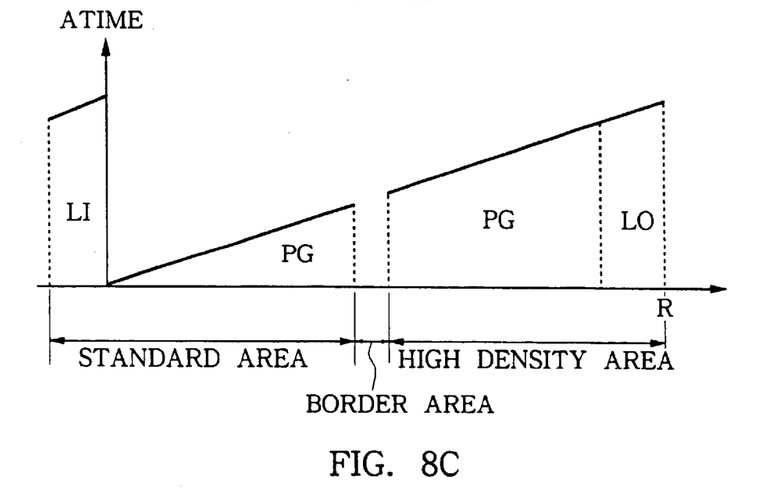

FIGS. 8A to 8C are diagrams showing relation between absolute time (ATIME) of the program area PG which is specified by the subcode and radius position (R).

In the case of a conventional CD, as shown in FIG. 8A, the absolute time of the program area PG and the lead-out area LO changes linearly from 0 to the maximum value with increase of the radius position. In the case of the present embodiment of the invention, as shown in FIG. 8B, discontinuity in the absolute time occurs in the border area. The lead-in area LI in both the standard area and the high density area has no absolute time.

Detection as to whether the area in qustion is the standard area 11 or the high density area 12 is made by referring to the absolute time written in TOC information. For instance, if it is written in the TOC information that the standard area 11 starts from absolute time "00 minute 00 second 00 frame" and the high density area 12 starts from absolute time "10 minute 00 second 00 frame", the end of the standard area 11 can be detected from the lead-out area LO. Further, since in the TOC information of the high density area 12, the lead-in area LI is located at a position which is several tens tracks reverse to the starting time of the high density area 12, the high density area 12 can be readily located from this information. It is therefore unnecessary to access the border area 13.

In the case where the optical disk 10 is of a format as shown in FIG. 8C, all TOC information can be secured in the lead-in area LI of the standard area 11. In this case, processing in the border area 13 is made in the following manner.

Figure 9:
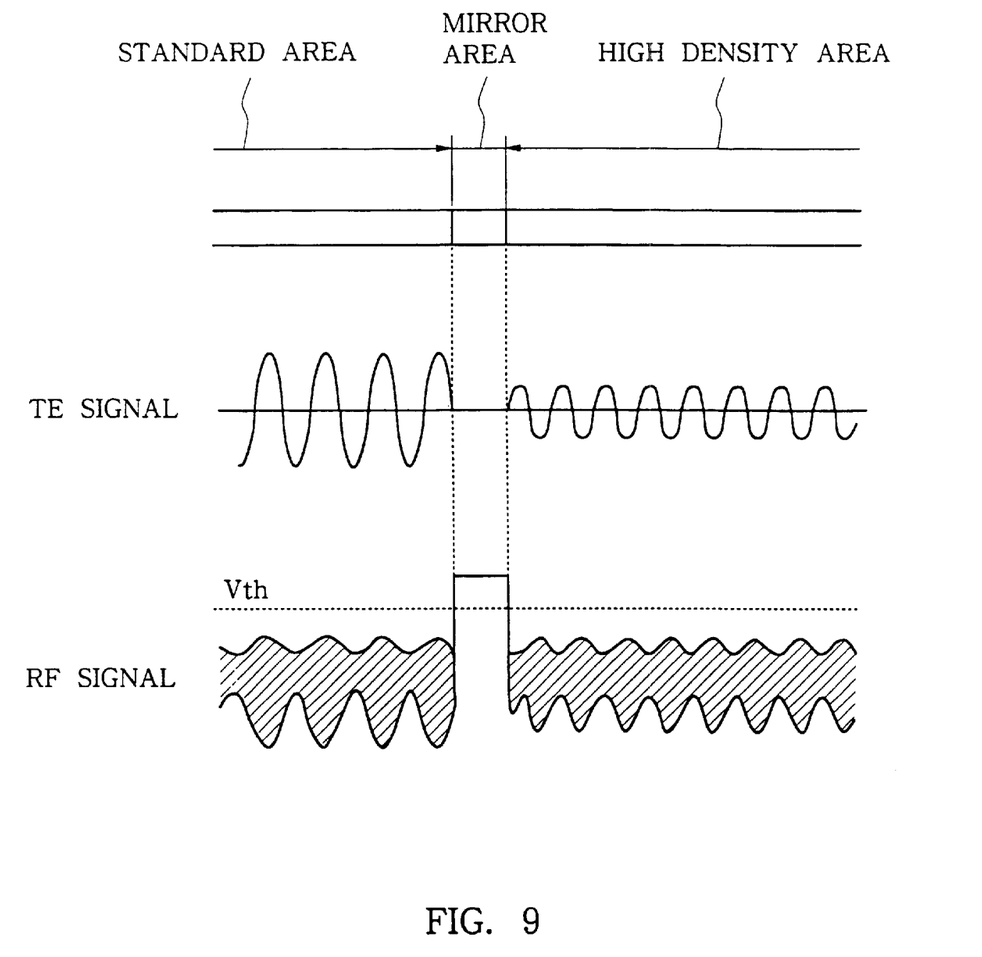
FIG. 9 is a diagram for explaining a method for detecting the border area of the optical disk.

In the case where the border area 13 is a mirror area as shown in FIG. 5A, difference in refractive index in the mirror area is utilized as illustrated in FIG. 9. In the mirror area, an RF signal of a level which is higher than in other areas is produced and, therefore, feeding of the optical pickup 22 is continued until the RF signal of the higher level is detected by threshold level Vth while feed distance from the end of the mirror area to a target position is calculated during feeding of the optical pickup 22. When the optical pickup 22 has been fed from the end point of detection of the high RF signal (end of the mirror area) to the vicinity of the target position, address is read, track number to the target position is calculated and tracking is performed by counting the track number. Reproduction is started upon detecting the address of the target position.

In the case where the border area 13 is a variable pitch area as shown in FIG. 5B, continuous seek operation or tracking is made possible by adjusting the servo parameter from the standard area 11 to the high density area 12.

According to the above described embodiment of the invention, the optical disk 10 has the standard area 11 on the inner peripheral side of the disk and the high density area 12 on the outer peripheral side of the disk so that it can be utilzied in the following ways:

(1) A standard software is recorded on the inner peripheral side and a high class software having a higher function is recorded on the outer peripheral side.
(2) A game software for demonstration purpose is recorded on the inner peripheral side and an actual game software is recorded on the outer peripheral side.
(3) A beginner's dictionary or a dictionary for general purpose is recorded on the inner peripheral side and a large dictionary for a professional use such as medical science and physics is recorded on the outer peripheral side.
(4) Data of a part of a music piece is recorded on the inner periheral side and data of the entire music piece is recorded on the outer peripheral side.
(5) Rough map data is recorded on the inner peripheral side and more detailed map data is recorded on the outer peripheral side.

By such application of the optical disk, the entire service can be provided to a user having a high-class professional player and a part of the service, though not the entire service, can be provided to a user having an ordinary home player whereby the optical disk has the demonstration effect that the user can recognize a part of the service.

Referring now to FIGS. 10 to 15, another embodiment of the invention will be described.

Figure 10:
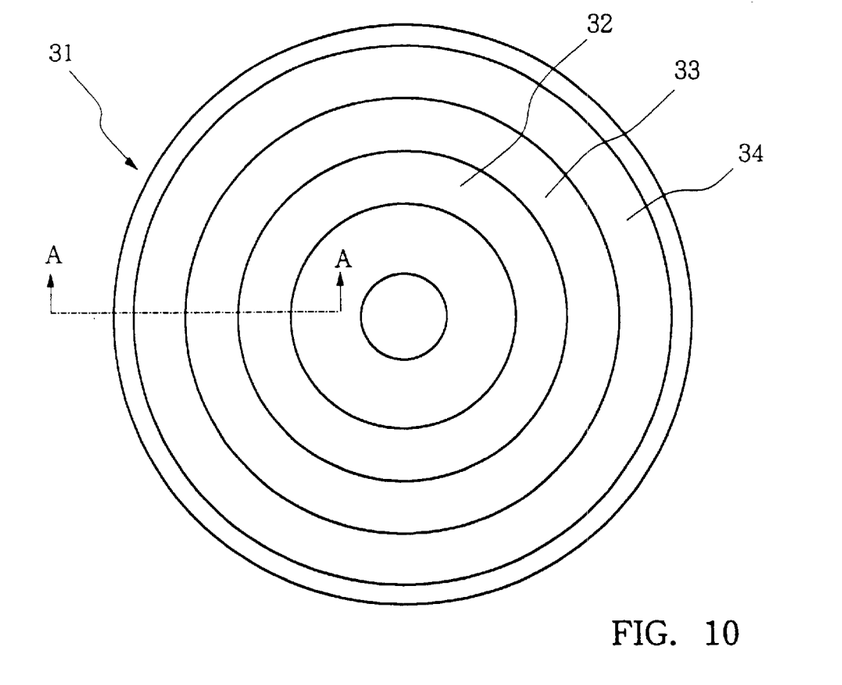
FIG. 10 is a plan view of another embodiment of the optical disk made according to the invention.

FIG. 10 schematically illustrates another embodiment of the optical disk made according to the invention.

An optical disk 31 has, from the inner periphery to the outer periphery, a ROM (read-only memory) area 32 used for reading only, a RAM (random access memory) area 33 in which recorded information can be rewritten and a WO (write once) are 34 in which information can be written only once.

Figure 11:
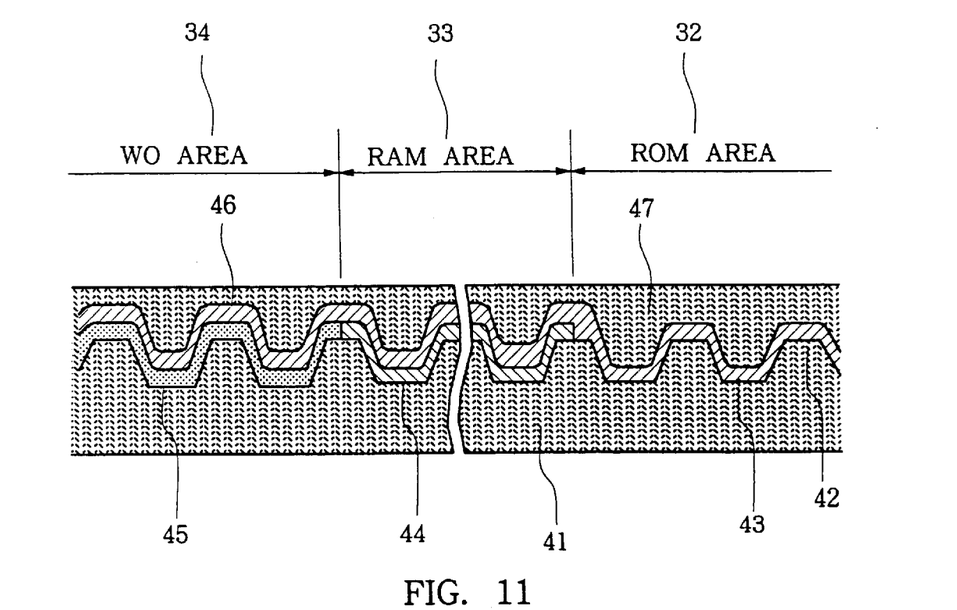
FIG. 11 is an A—A sectional view of FIG. 1.

In FIG. 11 which is a sectional view taken along arrows A—A in FIG. 10, the optical disk 31 has a transparent substrate 41 in which lands 42 and grooves 43 (and pits in the ROM area 32) are formed with the interval of, e.g., 1.6 μm. An alloy layer 44 consisting of an optomagnetic material such, for example, as GdTbCuFe and GdCuFe or a phase changing material such, for example, as GeSbTe and AgInSbTe is formed in the RAM area 33 and a dyestuff layer 45 consisting of, e.g., cyanin dyestuff, phthalocyanine dyestuff and diazo type dyestuff is formed in the WO area 34. A reflectig film 46 consisting of Al is formed over these areas and also the ROM area 32 and a protective layer 47 is formed over the entire reflecting film 46.

Figure 12A:
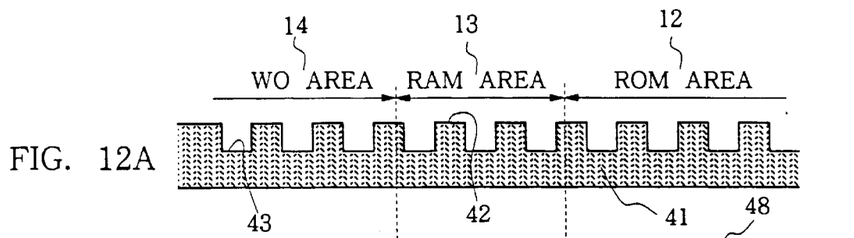
FIGS. 12A to 12I are diagrams showing a method for manufacturing the optical disk of this embodiment.
Figure 12B:
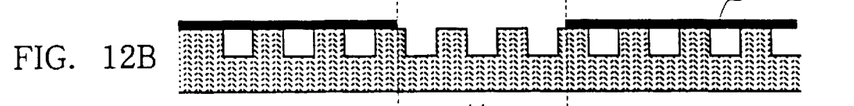
Figure 12C:
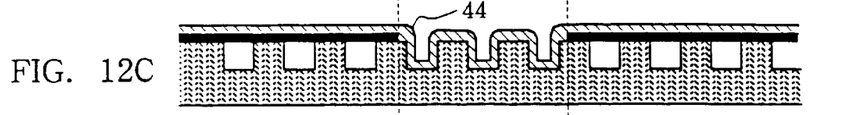
Figure 12D:
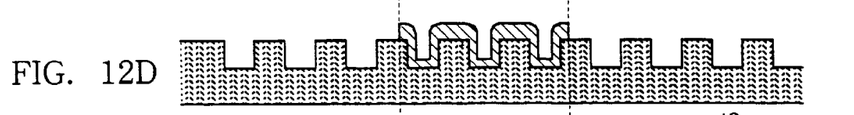
Figure 12E:
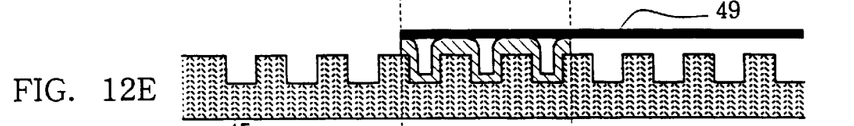
Figure 12F:
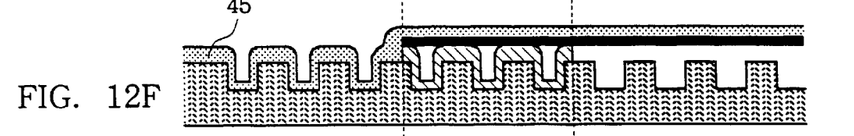
Figure 12G:
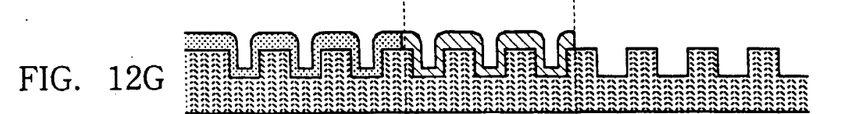
Figure 12H:
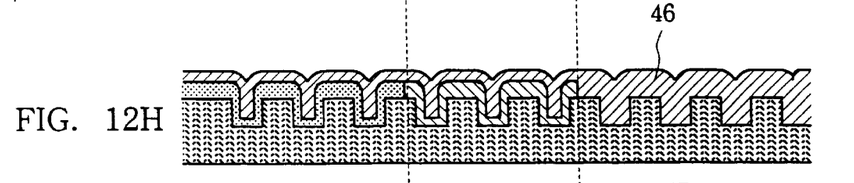
Figure 12I:
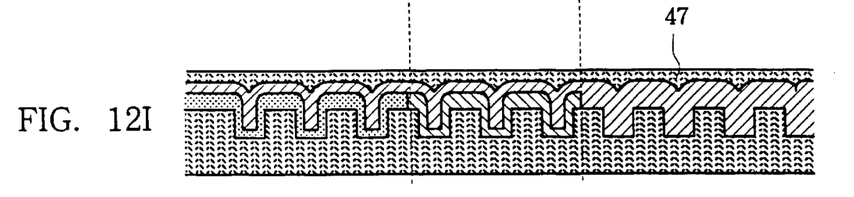
Figure 13:
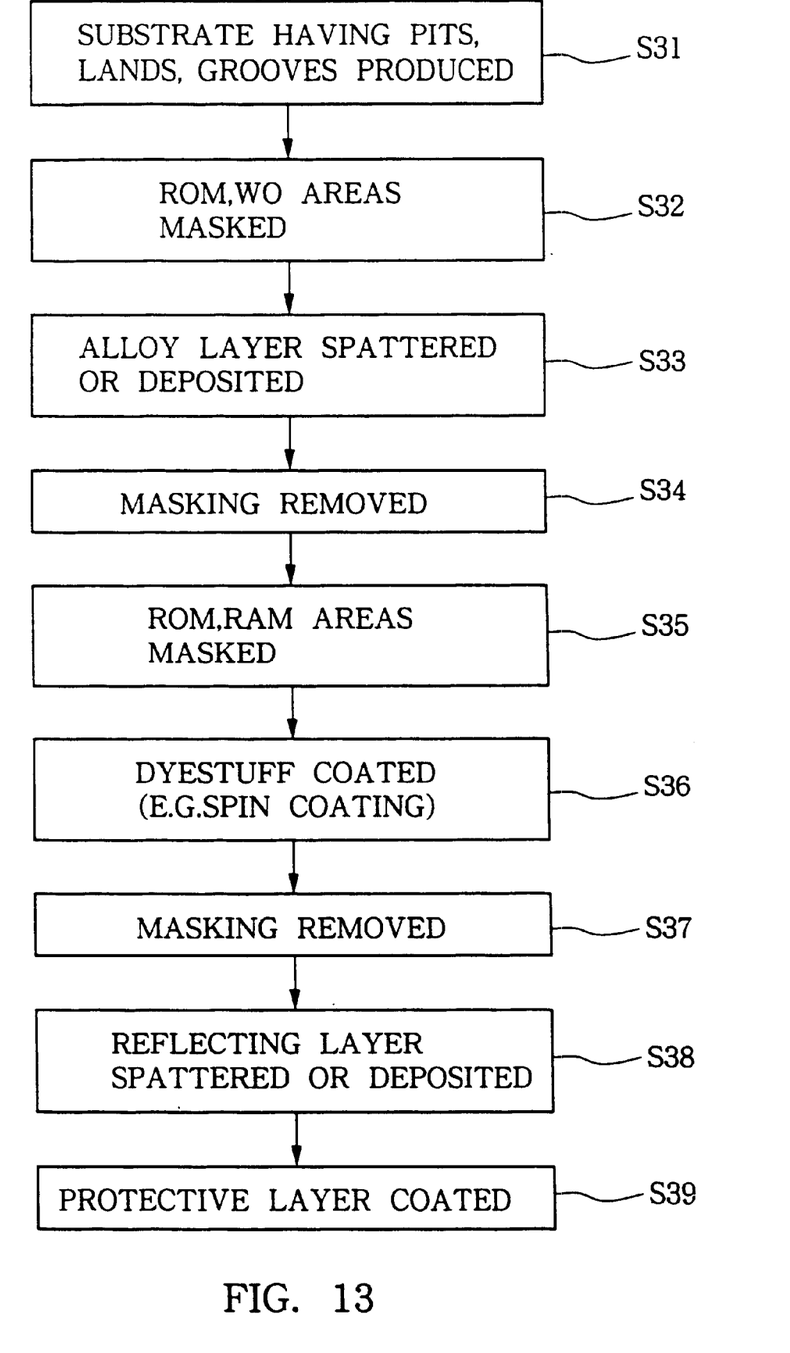
FIG. 13 is a flow chart showing this method for manufacturing the optical disk.

FIGS. 12A to 12I are sectional views illustrating a method for manufacturing this optical disk 31 and FIG. 13 is flow chart showing the manufacturing method.

(1) First, a substrate 41 in which the lands 42 and grooves 43 (also pits in the ROM area 32) are formed is produced (FIG. 12A and S31 in FIG. 13).
(2) Then, the ROM area 32 and the WO area 34 other than the RAM area 33 of the substrate 41 are masked with a masking material 48 such as a film (FIG. 13B and S32 of FIG. 13).
(3) The alloy layer 44 is formed thereon by spattering or vapor deposition (FIG. 12C and S33 of FIG. 13).
(4) The masking material 48 is removed (FIG. 12D and S34 of FIG. 13).
(5) Then, the ROM area 32 and the RAM area 33 other than the WO area 34 of the substrate 41 are masked with a masking material 49 such as a film (FIG. 12E and S35 of FIG. 13).
(6) The dyestuff layer 45 is formed thereon by coating dyestuff by spin coating (FIG. 12F and S36 of FIG. 13).
(7) The masking material 49 is removed (FIG. 12G and S37 of FIG. 13).
(8) The reflecting film 46 is formed thereon by spattering or vapor deposition (FIG. 12H and S38 of FIG. 13).
(9) Finally, the protective layer 47 is coated on the entire reflecting film 46 to complete the optical disk 31 (FIG. 12I and S39 of FIG. 13).

Recording and reproduction on this optical disk 31 will now be described.

Figure 14:
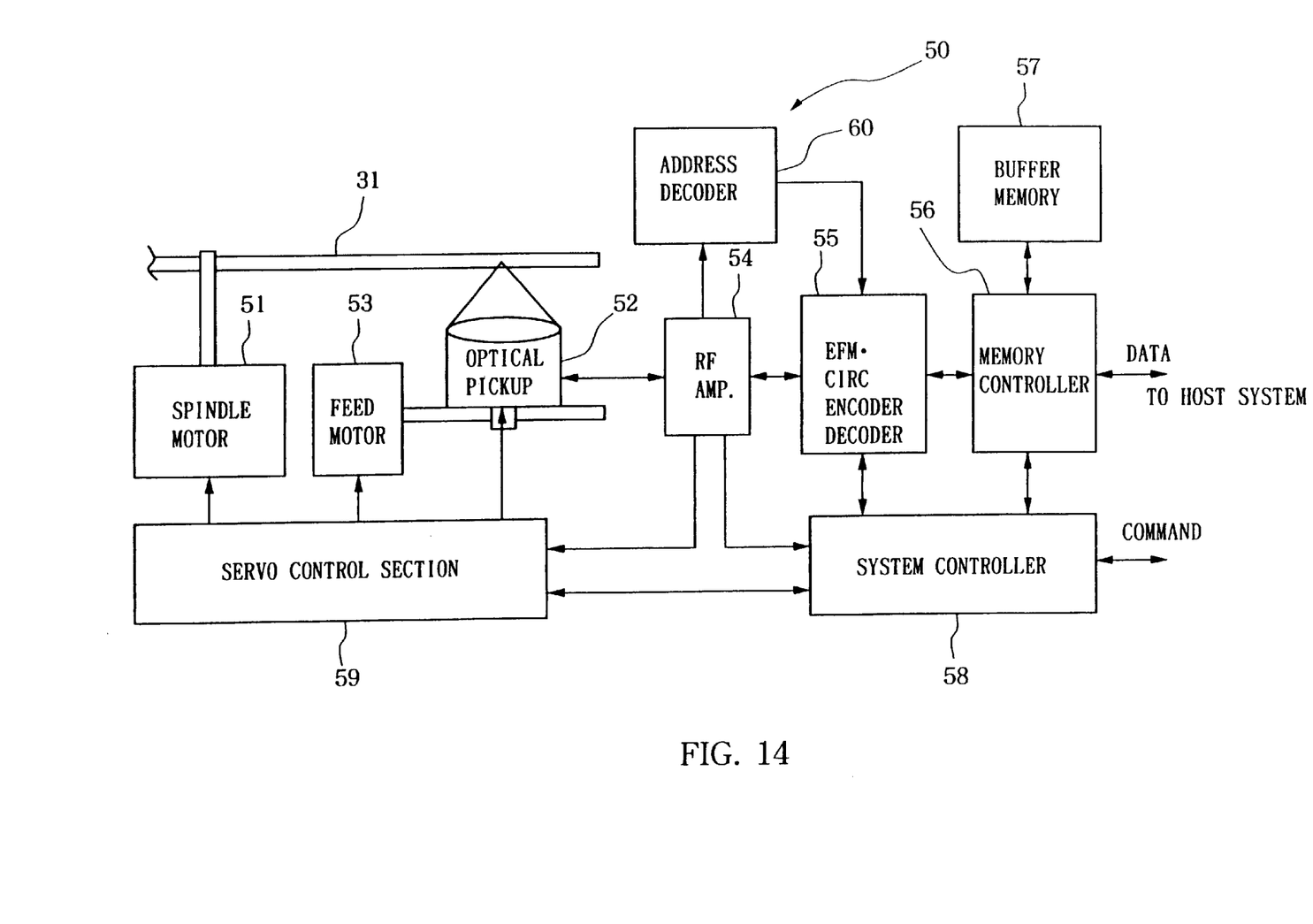
FIG. 14 is a block diagram showing an example of drive device for driving this optical disk.

FIG. 14 illustrates an optical disk drive device 50 applicalbe to this optical disk 31.

The optical disk 31 is driven and rotated by a spindle motor 51 at a constant linear velocity. An optical pickup 52 as laser beam irradiation means and laser beam detection means is provided at a position opposite to the recording surface of the optical disk 31. The optical pickup 52 is driven by a feed motor 53 in the radial direction of the optical disk 31.

In the reproduction mode, a read out signal from the optical disk 31 is amplified by an RF (high-frequency) amplifier 54 and is supplied to an EFM-CIRC (cross interleaved Read-Solomon code) encoder-decoder 55. The encoder-decoder 55 subjects the amplified signal to EFM demodulation and CIRC decoding and supplies its output data to a buffer memory 57 to be once stored therein under the control of a memory controller 56 and supplies control information to a system controller 58. Data which is once stored in the buffer memory 57 is sequentially read out under the control of the memory controller 56 and supplied to an unillustrated host system. A servo control sect ion 59 performs focusing and tracking controls of the optical pickup 52 in response to the out-put of the RF amplifier 54 and also controls the spindle motor 51 and the feed motor 53 in accordance with a command from the system controller 58.

In the recording mode, data to be recorded stored in the buffer memory 57 is read out through the memory controller 56 and is subjected to CIRC and EFM by the EFM-CIRC encoder-decoder 55 to be converted to a record signal. The record signal is supplied to the optical pickup 52 through the RF amplifier 54. The optical pickup 52 modulates laser beam with the record signal and forms record pits on the optical disk 31. In the RAM area 33 and the WO area 34 of the optical disk 31, wobble is formed in the grooves 43. An address decoder 60 generates record address of the optical disk 31 in response to a signal provided by reading this wobble by the optical pickup 52 and this address information is supplied to the encoder-decoder 55.

Figure 15A:
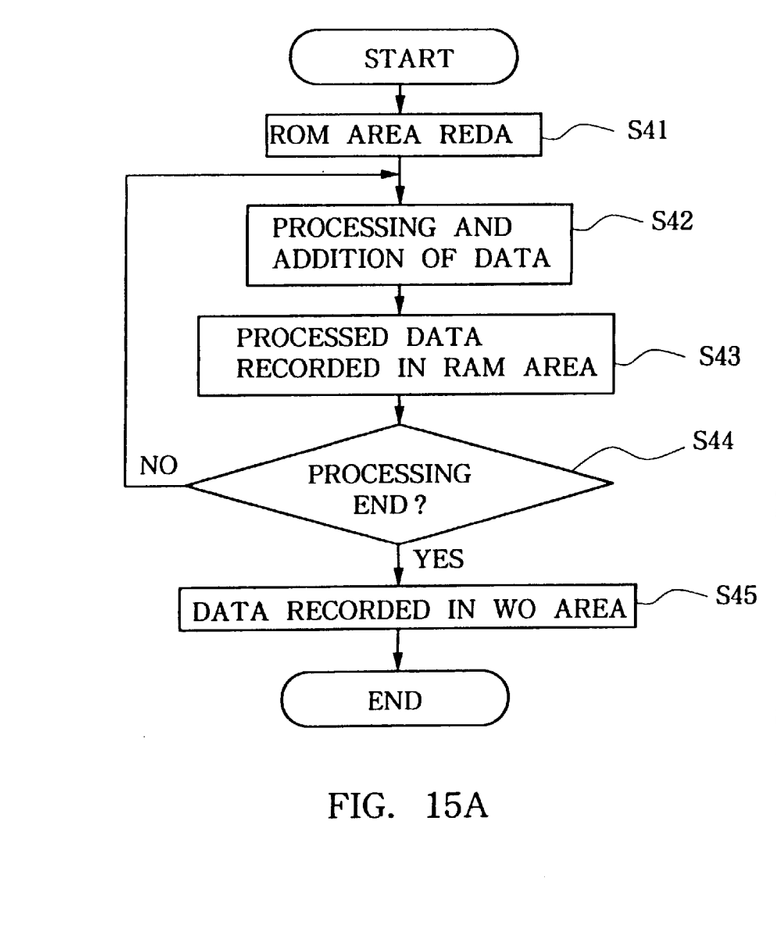
FIGS. 15A and 15B are flow charts for explaining examples of recording and reproducing of this optical disk.
Figure 15B:
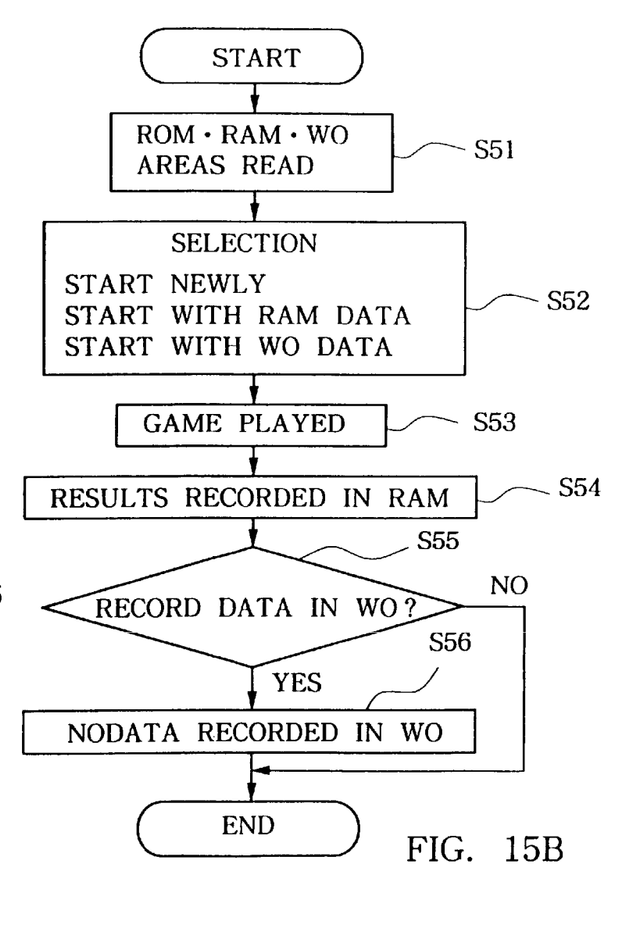

Examples of recording and reproduction of the optical disk 31 by using the above described optical disk drive device 50 are shown in FIGS. 15A and 15B.

FIG. 15A shows an example of recording final processed data in the WO area 34.

In a floppy disk or other various types of recording media, overwrite inhibit can be made. Such overwrite inhibit howver is applied to the media as a whole and the media cannot cope with a demand for overwriting a part of data. For performing overwriting, the overwrite inhibit of the media must be removed. In this case, there occurs a case where the user erroneously overwrites data on other necessary data. In the present example, therefore, occurrence of such error is prevented by using the RAM area 33 as a draft area and the WO area 34 as a fair copy area.

More specifically, data file etc. which the user uses are recorded in the ROM area 32. Necessary data is read from the ROM area 32 (S41). Then, this data is processed or new data is added to this data (S42) and resulting data is overwritten in the RAM area 33 (S43) Since rewriting can be made any number of times in the RAM area 33, the user can amend the data until he is finally satisfied. Upon completion of processing of data (S44), finally processed data is recorded in the WO area 34 (S45). Data which is recorded in the WO area 34 is in the same state as overwrite inhibit has been applied to it. Thus, overwrite inhibit can be applied only to important data so that convenience in the use of the optical disk 31 is improved.

FIG. 15B shows an example of recording best data in a game in the WO area 34.

In a role playing game, for example, there arises a case where a game user desires to preserve information of a cleared stage and informaton required for clearing. In a shooting game, points gained in each stage is important information and, hence, the game user may desire to preserve this information in addition to information of a cleared stage. Thus, the game user desires to preserve information of the highest point gained and the most advanced stage cleared as the best results cleared while he desires to play the game and renew points and advance to a further stage. Since points gained cannot be renewed each time, he may sometimes desire to proceed further from a state where he has gained the best data. Further, games tend to become large-scaled including many intermediate information such as points gained and techniques.

In the present example, the best data is recorded in the WO area 34 and currently proceeding data is recorded in the RAM area 33. First, at the start of the game, the ROM area 32, the RAM area 33 and the WO area 34 are read out (S51) and selection is made as to whether the game is started newly, or the game is started by using data of the RAM area 33 or the game is started by using data of the WO area 34 (S52). As a result of the selection, data is read out and the game is started (S53). Data during progress of the game is successively recorded in the RAM area 33 (S54). When the best data is gained (S55), the data is shifted to the WO area 34 (S56). If the WO area 34 is selected in the step 52, the game is started from the best score state.

As described above, according to this embodiment, convenience in the use of the optical disk 31 can be improved. In this embodiment, the ROM area is not essential but an optical disk having the RAM area and the WO area only can achieve the advantageous result of the invention.

What is claimed is:

1. A method of manufacturing an optical disk comprising:
   a first masking step of covering a portion of an optical disk substrate, excluding a first area, with a masking material;
   a step of forming an alloy layer, which includes an optomagnetic material, on the substrate masked by the first masking step;
   a first masking removing step of removing the masking material and overlying optomagnetic material from the substrate formed with the alloy layer;
   a second masking step of covering a portion of the substrate, excluding a second area which is different from the first area, with a masking material;
   a step of forming a dyestuff layer, which changes with heat, on the substrate masked by the second masking step;
   a second masking removing step of removing the masking material and overlying dyestuff from the substrate formed with the dyestuff layer; and
   a step of forming a reflecting layer on the alloy layer in the first area and the dyestuff layer in the second area.

2. An optical disk manufactured by the method as defined in claim 1.

3. A method of manufacturing an optical disk comprising:
   a first masking step of covering a portion of an optical disk substrate, excluding a first area, with a masking material;
   a step of forming an alloy layer, which includes a phase changing material, on the substrate masked by the first masking step;
   a first masking removing step of removing the masking material and overlying phase changing material from the substrate formed with the alloy layer;
   a second masking step of covering a portion of the substrate, excluding a second area which is different from the first area, with a masking material;
   a step of forming a dyestuff layer, which changes with heat, on the substrate masked by the second masking step;
   a second masking removing step of removing the masking material and overlying dyestuff from the substrate formed with the dyestuff layer; and
   a step of forming a reflecting layer on the alloy layer in the first area and the dyestuff layer in the second area.

4. An optical disk manufactured by the method as defined in claim 3.

5. A method of manufacturing an optical disk comprising:
   a first masking step of covering a portion of an optical disk substrate, excluding a first area, with a masking material;
   a step of forming an alloy layer, which includes an optomagnetic material, on the substrate masked by the first masking step;
   a first masking removing step of removing the masking material and overlying optomagnetic material from the substrate formed with the alloy layer;
   a second masking step of covering a portion of the substrate, excluding a second area which is different in at least a part thereof from the first area, with a masking material;
   a step of forming a dyestuff layer, which changes with heat, on the substrate masked by the second masking step;

a second masking removing step of removing the masking material and overlying dyestuff from the substrate formed with the dyestuff layer; and     a step of forming a reflecting layer on the alloy layer in the first area and the dyestuff in the second area.

6. An optical disk manufactured by the method as defined in claim 5.

7. A method for manufacturing an optical disk comprising:

a first masking step of covering a portion of an optical disk substrate, excluding a first area, with a masking material;

a step of forming an alloy layer, which includes a phase changing material, on the substrate masked by the first masking step;

a first masking removing step of removing the masking material and overlying phase changing material from the substrate formed with the alloy layer;

a second masking step of covering a portion of the substrate, excluding a second area which is different in at least a part thereof from the first area, with a masking material;

a step of forming a dyestuff layer, which changes with heat, on the substrate masked by the second masking step;

a second masking removing step of removing the masking material and overlying dyestuff from the substrate formed with the dyestuff layer; and     a step of forming a reflecting layer on the alloy layer in the first area and the dyestuff layer in the second area.

8. An optical disk manufactured by the method as defined in claim 7.

\* \* \* \* \*